United States Patent
Wentink et al.

(10) Patent No.: US 9,907,070 B2
(45) Date of Patent: Feb. 27, 2018

(54) CHANNEL ACCESS DEFERRAL MECHANISM

(71) Applicant: QUALCOMM Incorporated, San Diego, CA (US)

(72) Inventors: Maarten Menzo Wentink, Naarden (NL); Simone Merlin, Solana Beach, CA (US)

(73) Assignee: QUALCOMM Incorporated, San Diego, CA (US)

(*) Notice: Subject to any disclaimer, the term of this patent is extended or adjusted under 35 U.S.C. 154(b) by 133 days.

(21) Appl. No.: 14/549,314

(22) Filed: Nov. 20, 2014

(65) Prior Publication Data

US 2015/0146700 A1 May 28, 2015

Related U.S. Application Data

(60) Provisional application No. 61/907,852, filed on Nov. 22, 2013, provisional application No. 61/913,669, filed on Dec. 9, 2013, provisional application No. 61/916,039, filed on Dec. 13, 2013, provisional application No. 61/930,223, filed on Jan. 22, 2014.

(51) Int. Cl.
| | |
|---|---|
| *H04W 72/04* | (2009.01) |
| *H04W 74/08* | (2009.01) |
| *H04L 1/00* | (2006.01) |
| *H04L 5/00* | (2006.01) |
| *H04L 1/18* | (2006.01) |

(52) U.S. Cl.
CPC ....... *H04W 72/0446* (2013.01); *H04L 1/0002* (2013.01); *H04L 1/0033* (2013.01); *H04L 1/0057* (2013.01); *H04L 5/0055* (2013.01); *H04W 74/0816* (2013.01); *H04L 1/18* (2013.01)

(58) Field of Classification Search
CPC .......... H04W 72/0446; H04W 74/0816; H04L 1/0002; H04L 1/0033; H04L 1/0057; H04L 5/0055
See application file for complete search history.

(56) References Cited

U.S. PATENT DOCUMENTS

| | | |
|---|---|---|
| 6,367,045 B1 | 4/2002 | Khan et al. |
| 7,813,324 B1 | 10/2010 | Goel et al. |
| 8,964,557 B2 | 2/2015 | Tong et al. |
| 2004/0120434 A1 | 6/2004 | Chang et al. |

(Continued)

FOREIGN PATENT DOCUMENTS

WO    WO-2007052986 A1    5/2007

OTHER PUBLICATIONS

International Search Report and Written Opinion—PCT/US2014/066826—ISA/EPO—Feb. 16, 2015.

*Primary Examiner* — Un C Cho
*Assistant Examiner* — Jeremy Costin
(74) *Attorney, Agent, or Firm* — Paradice and Li LLP

(57) ABSTRACT

A method for confirming receipt of an aggregated data frame containing one or more decoding errors is disclosed. A wireless device receives the aggregated data frame from another device over a wireless channel, determines a transmit duration of the aggregated data frame, and defers access to the channel for a time period selected as either an EIFS duration or a DIFS duration based, at least in part, on the transmit duration, and then transmits a block acknowledgement frame to the other device after the time period.

16 Claims, 11 Drawing Sheets

(56) References Cited

U.S. PATENT DOCUMENTS

| | | |
|---|---|---|
| 2005/0163058 A1 | 7/2005 | Nabetani et al. |
| 2006/0034274 A1 | 2/2006 | Kakani et al. |
| 2006/0092871 A1* | 5/2006 | Nishibayashi ........ H04L 1/1671 370/328 |
| 2007/0116035 A1 | 5/2007 | Shao et al. |
| 2007/0171933 A1 | 7/2007 | Sammour et al. |
| 2008/0056303 A1 | 3/2008 | Sebire et al. |
| 2015/0092697 A1 | 4/2015 | Yeow et al. |
| 2015/0249529 A1 | 9/2015 | Zheng et al. |

* cited by examiner

| Block ACK frame having 32 bits in bitmap and total size of 56 bytes | | | | | | |
|---|---|---|---|---|---|---|
| TX rate | 6 Mbps | 12 Mbps | 24 Mbps | 36 Mbps | 48 Mbps | 54 Mbps | 63 Mbps |
| Tx Duration | 100 us | 60 us | 40 us | 36 us | 32 us | 32 us | 28 us |

| Block ACK frame having 64 bits in bitmap and total size of 88 bytes | | | | | | |
|---|---|---|---|---|---|---|
| TX rate | 6 Mbps | 12 Mbps | 24 Mbps | 36 Mbps | 48 Mbps | 54 Mbps | 63 Mbps |
| Tx Duration | 140 us | 80 us | 52 us | 40 us | 36 us | 36 us | 32 us |

| Block ACK frame having 128 bits in bitmap and total size of 152 bytes | | | | | | |
|---|---|---|---|---|---|---|
| TX rate | 6 Mbps | 12 Mbps | 24 Mbps | 36 Mbps | 48 Mbps | 54 Mbps | 63 Mbps |
| Tx Duration | 228 us | 124 us | 72 us | 56 us | 48 us | 44 us | 32 us |

| Block ACK frame having 256 bits in bitmap and total size of 280 bytes | | | | | | |
|---|---|---|---|---|---|---|
| TX rate | 6 Mbps | 12 Mbps | 24 Mbps | 36 Mbps | 48 Mbps | 54 Mbps | 63 Mbps |
| Tx Duration | 396 us | 208 us | 116 us | 84 us | 68 us | 64 us | 32 us |

FIG. 6

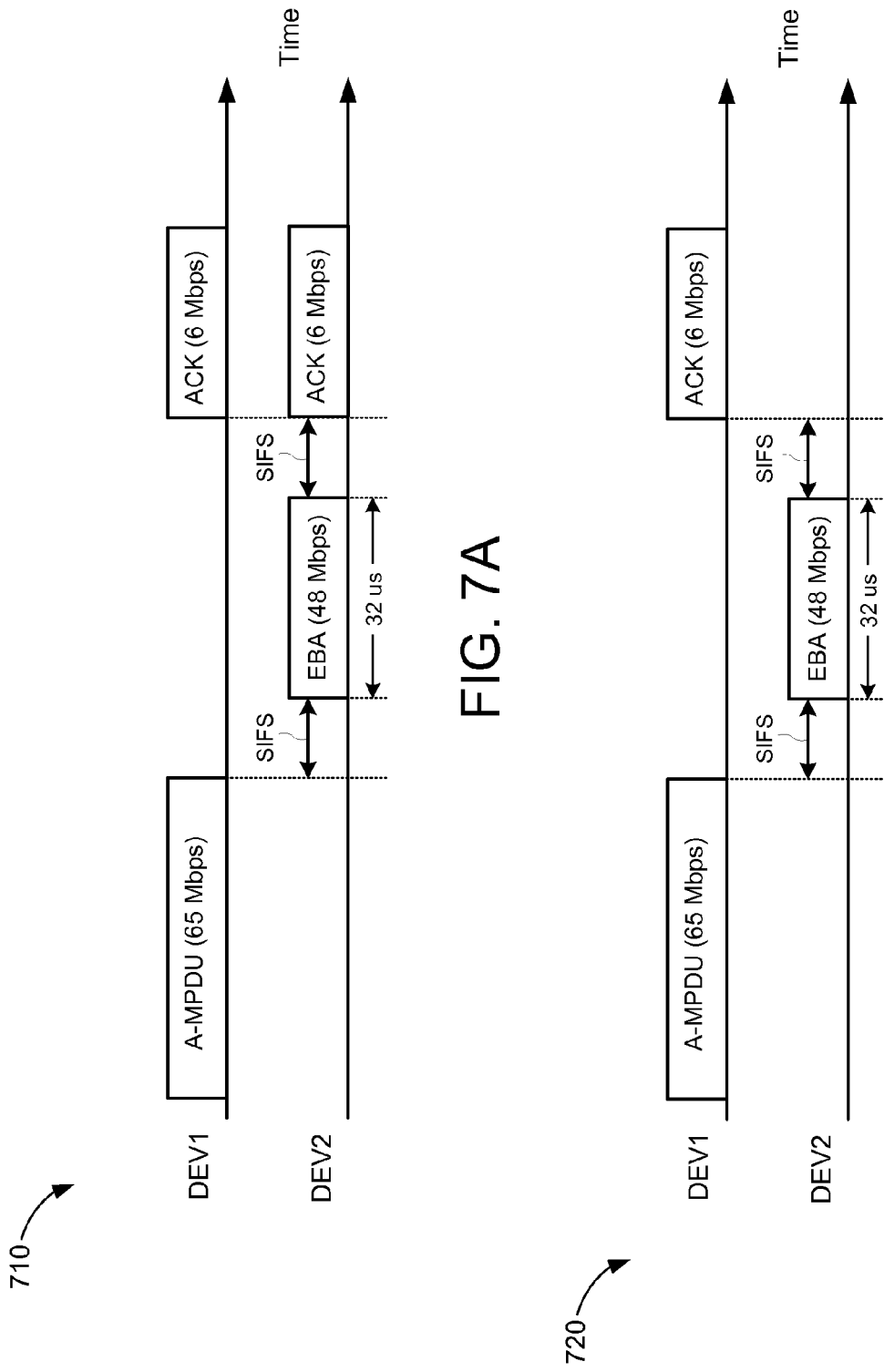

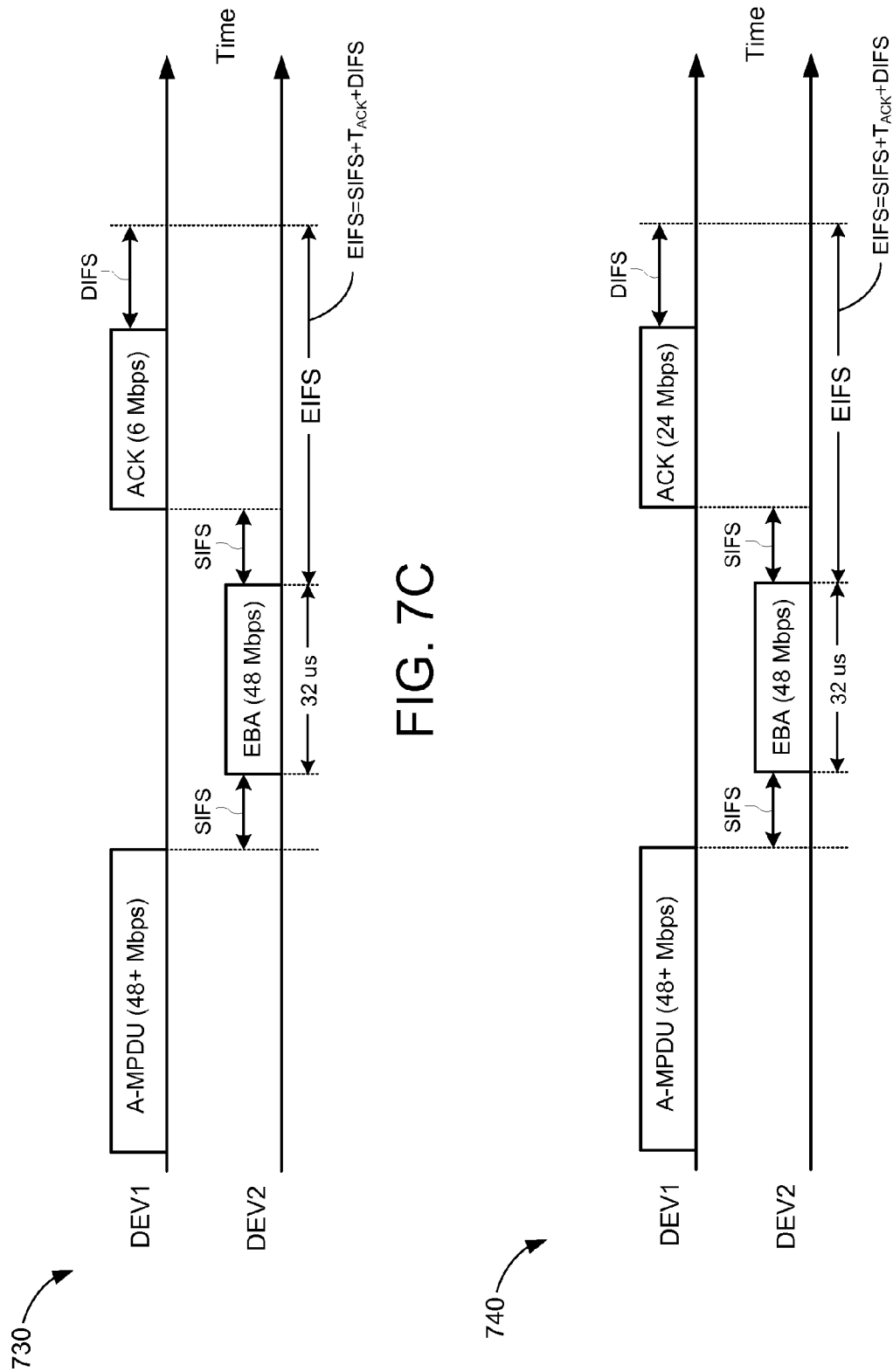

CHANNEL ACCESS DEFERRAL MECHANISM

CROSS-REFERENCE TO RELATED APPLICATIONS

This application claims priority to the following U.S. Provisional Patent Applications: U.S. Provisional Patent Application No. 61/907,852 entitled "Extended Block Acknowledgement Protocol" filed Nov. 22, 2013; U.S. Provisional Patent Application No. 61/913,669 entitled "Extended Block Acknowledgement Protocol" filed Dec. 9, 2013; U.S. Provisional Patent Application No. 61/916,039 entitled "Extended Block Acknowledgement Protocol" filed Dec. 13, 2013; and U.S. Provisional Patent Application No. 61/930,223 entitled "Extended Block Acknowledgement Protocol" filed Jan. 22, 2014; the entireties of which are all hereby incorporated by reference herein.

TECHNICAL FIELD

The present embodiments relate generally to wireless networks, and specifically block acknowledgments in wireless networks.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. Once a STA is associated with the AP, the AP and the STA may exchange data frames. When the STA receives a data frame from the AP, the STA is to transmit an acknowledgment (ACK) frame back to the AP to acknowledge receipt of the data frame.

A block acknowledgement procedure may allow the STA to acknowledge receipt of multiple data frames using a single ACK frame. More specifically, the STA may use a block acknowledgment (BA) frame to acknowledge receipt of a plurality of data frames and/or a number of aggregated data frames, thereby reducing the number of acknowledgement frames transmitted to the AP (and thus conserving capacity of the shared wireless medium). More specifically, when the block acknowledgement procedure does not use fragmentation, a compressed block acknowledgement (CBA) frame may be used to acknowledge a plurality of aggregated data frames. The CBA frame includes an 8-octet bitmap (e.g., containing 8*8=64 bits) that may be used to acknowledge receipt of up to 64 individual data frames. By limiting the CBA frame's bitmap to 64 bits, the transmit duration of the CBA frame may be minimized (e.g., compared with non-compressed BA frames) to reduce traffic on the wireless medium.

When an aggregated data frame includes decoding errors, it would be desirable to minimize the amount of time that a wireless device defers access to the wireless medium associated with the WLAN.

BRIEF DESCRIPTION OF THE DRAWINGS

The present embodiments are illustrated by way of example and are not intended to be limited by the figures of the accompanying drawings, where like reference numerals refer to corresponding parts throughout the drawing figures.

FIG. 6 depicts example transmission rates and transmit durations for block acknowledgement frames including various sizes of block acknowledgement bitmaps.

FIG. 7A shows a sequence diagram depicting an example frame exchange with a response EBA frame and dual EIFS truncation in accordance with some embodiments.

FIG. 7B shows a sequence diagram depicting an example frame exchange with a response EBA frame and single EIFS truncation in accordance with some embodiments.

FIG. 7C shows a sequence diagram depicting an example frame exchange with a response EBA frame, single EIFS truncation, and an EIFS duration after the EBA frame in accordance with some embodiments.

FIG. 7D shows a sequence diagram depicting an example frame exchange with a response EBA frame, single EIFS truncation, and an EIFS duration after the EBA frame in accordance with other embodiments.

DETAILED DESCRIPTION

Figure 1:
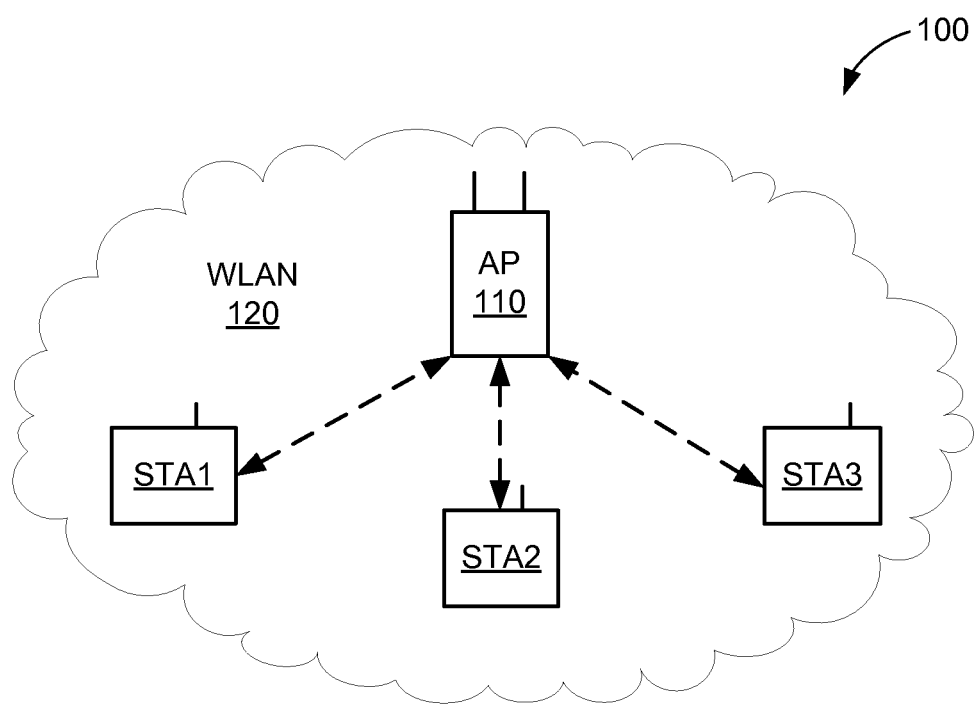
FIG. 1 shows a block diagram of a WLAN system within which at least some of the present embodiments may be implemented.

Exemplary embodiments of the disclosure are described below in the context of data exchanges between Wi-Fi enabled devices for simplicity only. It is to be understood that embodiments are equally applicable to data exchanges using signals of other various wireless standards or protocols. As used herein, the terms "WLAN" and "Wi-Fi" can include communications governed by the IEEE 802.11 family of standards, BLUETOOTH® (Bluetooth), HiperLAN (a set of wireless standards, comparable to the IEEE 802.11 standards, used primarily in Europe), and other technologies having relatively short radio propagation range. In addition, although described herein in terms of exchanging data frames between wireless devices, the present embodiments may be applied to the exchange of any data unit, packet, and/or frame between wireless devices. Thus, the term "data frame" may include any frame, packet, or data unit, such as, for example, protocol data units (PDUs), MAC protocol data units (MPDUs), and physical layer convergence procedure protocol data units (PPDUs). The term "A-MPDU" may refer to aggregated MPDUs. Further, as used herein, the term "compressed block acknowledgement (CBA) frame" may refer to BA frames that include a block acknowledgement bitmap of 8 bytes or octets, while the term "extended block acknowledgement (EBA) frame" may refer to BA frames that include a block acknowledgement bitmap of more than 8 bytes or octets (e.g., 32 bytes, 64 bytes, 128 bytes, and so on).

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice embodiments. In other instances, well-known circuits and devices are shown in block diagram form to avoid obscuring the present disclosure. The present embodiments are not to be construed as limited to specific examples described herein but rather to include within their scopes all embodiments defined by the appended claims.

As mentioned above, current Wi-Fi standards allow wireless devices (e.g., STAs and/or APs) to acknowledge multiple data frames or aggregated data frames using a single block acknowledgement (BA) frame. For example, a compressed block acknowledgment (CBA) frame typically contains an 8-octet block acknowledgement bitmap that may acknowledge receipt of up to 8*8=64 data frames. Thus, each bit in the CBA frame's block acknowledgement bitmap may indicate whether a corresponding one of 64 frames was received (e.g., where each bit in the block acknowledgement bitmap represents the status (e.g., success/failure) of a corresponding data frame).

Prior to a pair of wireless devices using BA frames to acknowledge each other's data transmissions, the wireless devices first enter a block acknowledgement setup phase during which capability information (e.g., buffer size and block acknowledgement policy) may be negotiated with each other. Once the setup phase is completed, the wireless devices may then send multiple frames to each other without waiting for individual ACK frames; instead, the receiving wireless device may acknowledge receipt of a plurality of data frames using a single BA frame. The block acknowledgement agreement may be torn down (e.g., terminated) by sending a Delete Block Acknowledgment (DELBA) frame to the other wireless device.

As mentioned above, it may be desirable to embed larger block acknowledgement bitmaps into BA frames so that each BA frame may acknowledge a larger number of data frames. For example, increasing the size of the block acknowledgement bitmap from 8 bytes to 32 bytes may allow a single BA frame to acknowledge receipt of up to 32*8=256 data frames. Increasing the number of bits in the block acknowledgement bitmap increases the overall size of the BA frame, and therefore may also increase the transmit duration of the BA frame (e.g., the signal propagation time associated with transmitting the BA frame from one wireless device to another wireless device). Increasing the transmit duration of BA frames may be undesirable because of non-compliance with one or more applicable provisions of the IEEE 802.11 family of standards.

Thus, in accordance with some embodiments, wireless devices may increase the size of the BA frame's block acknowledgement bitmap based, at least in part, on the transmission rate or link speed between the wireless devices. For example, if the transmission rate between the wireless devices is sufficiently high to transmit a larger block acknowledgement bitmap (e.g., a block acknowledgement bitmap having more than 8 bytes) in an amount of time similar to that associated with transmitting a block acknowledgement bitmap having 8 bytes at a basic transmission rate, then the wireless devices may employ extended block acknowledgement (EBA) frames having increased block acknowledgement bitmap sizes. In this manner, wireless devices may embed larger block acknowledgement bitmaps into BA frames without increasing BA frame transmit durations. Otherwise, if the transmission rate of the data frames is not sufficiently high (e.g., not greater than a threshold value), then the wireless devices may continue using CBA frames having 8-byte block acknowledgement bitmaps.

Thus, in accordance with the present embodiments, wireless devices may utilize an EBA frame having an n-octet block acknowledgement bitmap that allows for the acknowledgement of up to n*8 data frames, where n is an integer that may be based, at least in part, on the transmission rate or link speed between the wireless devices. For at least some embodiments, the EBA frame may include a 32-octet block acknowledgement bitmap that allows a wireless device to acknowledge up to 32*8=256 data frames. These and other aspects of the present embodiments are described in more detail below.

FIG. 1 is a block diagram of an example wireless network system 100 within which some embodiments may be implemented. The system 100 is shown to include three wireless stations STA1-STA3 (three illustrated for purely illustrative purposes), a wireless access point (AP) 110, and a wireless local area network (WLAN) 120. The WLAN 120 may be formed by a plurality of APs that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. In addition or in the alternative, two or more of STA1-STA3 may communicate with each other using, e.g., a peer-to-peer or ad-hoc network (e.g., without using the AP 110).

The AP 110 is assigned a unique MAC address that is programmed therein by, for example, the manufacturer of the access point. Similarly, each of STA1-STA3 is also assigned a unique MAC address. Each MAC address, which may be commonly referred to as the "burned-in address" or the organizationally unique identifier (OUI), in one embodiment includes six bytes of data. The first 3 bytes of the MAC address may identify which organization manufactured the device and may be assigned to such organizations by the Institute of Electrical and Electronic Engineers (IEEE). The second 3 bytes of the MAC address may be used to uniquely identify the individual device.

The stations STA1-STA3 may be any suitable Wi-Fi enabled wireless devices including, for example, network-enabled sensors, memory tags (RFID tags), smart meters, cell phones, personal digital assistants (PDAs), tablet devices, laptop computers, or the like. For at least some embodiments, stations STA1-STA3 may include a transceiver, one or more processing resources, one or more memory resources, and a power source (e.g., battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 4A, 4B, and 6.

The AP 110 may be any suitable device that allows one or more wireless devices to connect to a network (e.g., a LAN, WAN, MAN, and/or the Internet) via AP 110 using Wi-Fi, WiMax, Bluetooth, or any other suitable wireless communication standards. For at least one embodiment, AP 110 may include a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 4A, 4B, 6, and 8.

Figure 2:
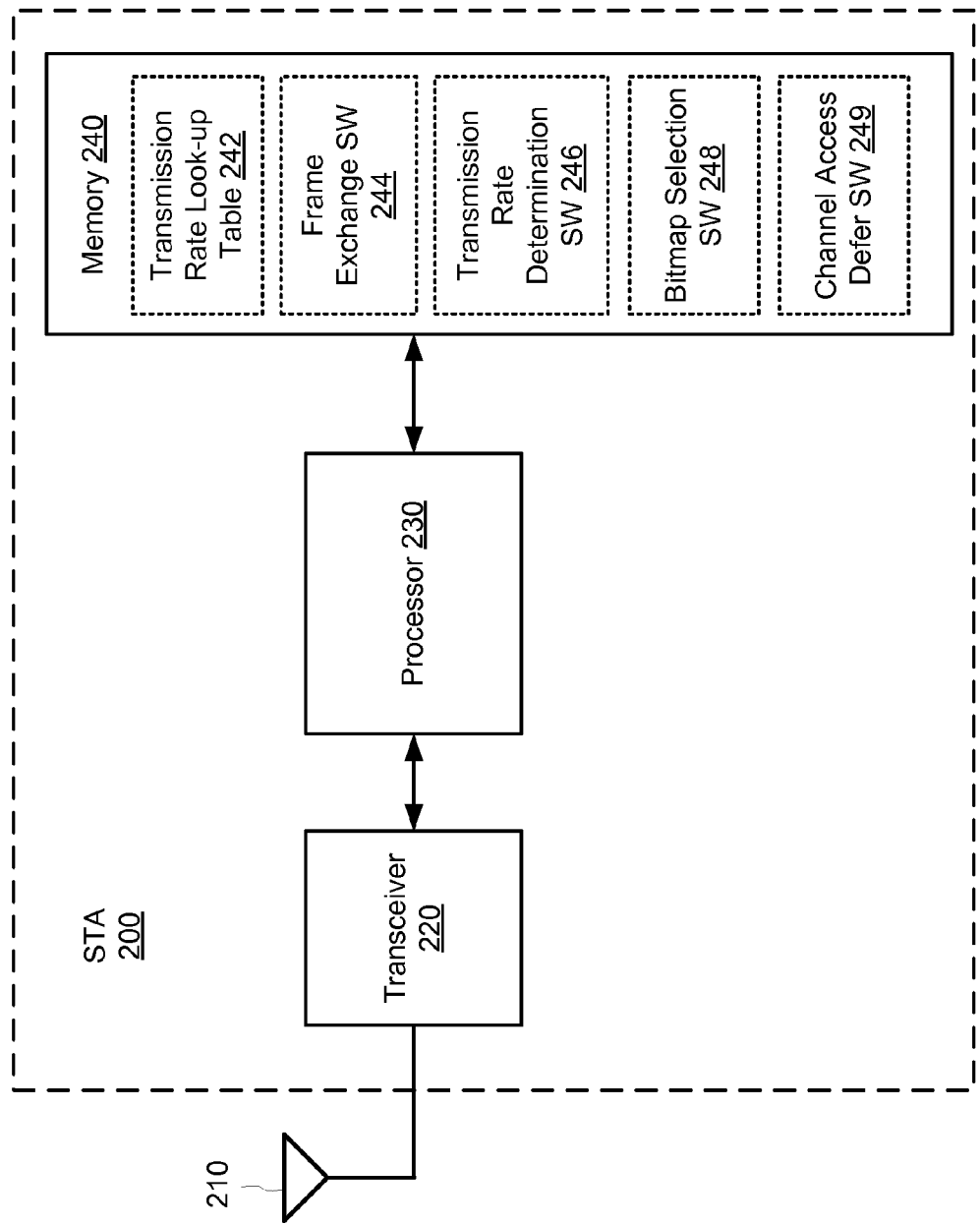
FIG. 2 shows a block diagram of a wireless station (STA) in accordance with some embodiments.

FIG. 2 shows a STA 200 that is one embodiment of at least one of the stations STA1-STA3 of FIG. 1. The STA 200 includes an antenna 210, a transceiver 220, a processor 230, and a memory 240. The transceiver 220 may be used to transmit signals to and receive signals from AP 110 and/or other STAs (see also FIG. 1) via antenna 210. In addition, the transceiver 220 may be used to scan the surrounding environment to detect and identify nearby access points (e.g., access points within range of STA 200) and/or other STAs using well-known active and/or passive scanning techniques. Although only one antenna is shown in FIG. 2 for simplicity, for actual embodiments, STA 200 may include any number of antennas, for example, to provide multiple-input multiple-output (MIMO) functionality.

Memory 240 may include a transmission rate look-up table 242 that stores a number of mappings between data frame transmission rates (e.g., PHY rates) and modulation and coding schemes (MCSs) used to transmit data frames to one or more other wireless devices. For example, the transmission rate look-up table 242 may include a plurality of storage locations, each including an MCS and a transmission rate for a corresponding device. This may allow the STA 200 to determine the transmission rate of a received data frame (or data frames) by extracting the MCS information from the data frame's header, and then using the extracted MCS information as a search key to look-up the transmission rate of the corresponding data frame(s). For some embodiments, the transmission rate look-up table 242 may be pre-populated (e.g., loaded with predetermined MCS-transmission rate mappings). For other embodiments, the STA 200 may dynamically store MCS-transmission rate mappings into the transmission rate look-up table 242.

Figure 4A:
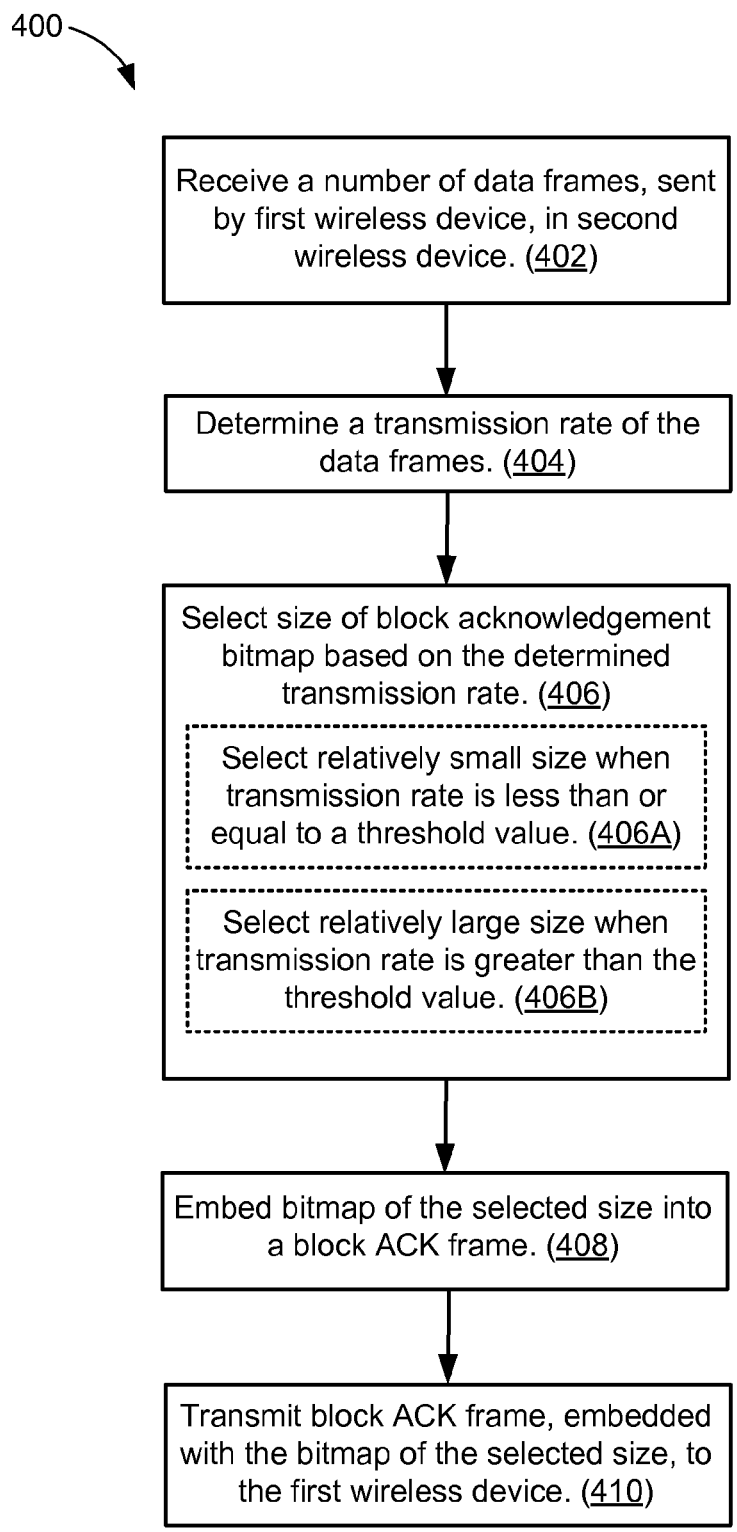
FIG. 4A is an illustrative flow chart depicting an example operation for selecting a size of a block acknowledgement bitmap in accordance with some embodiments.
Figure 4B:
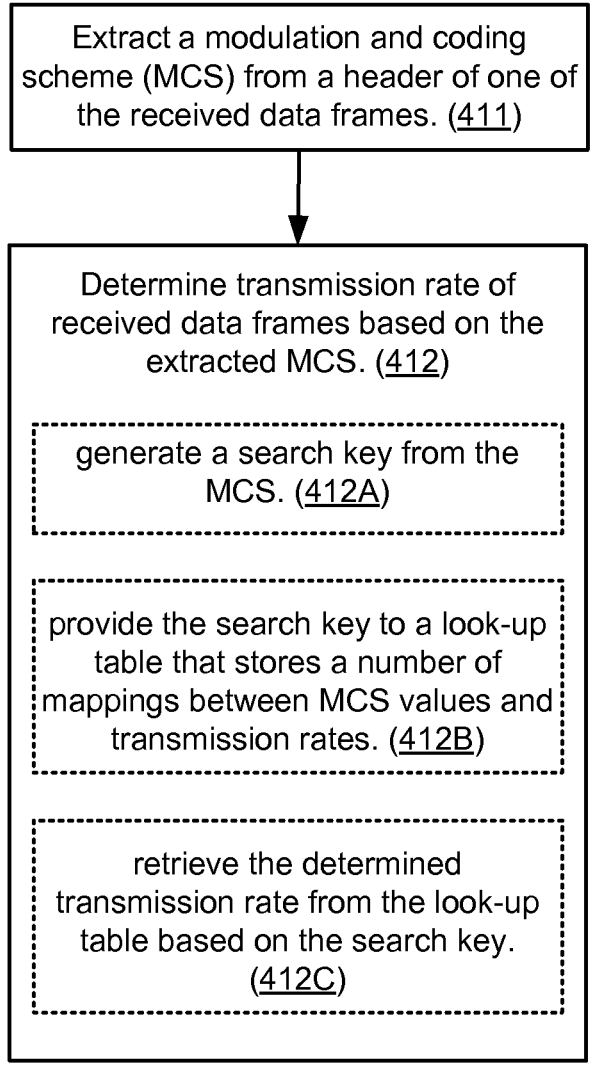
FIG. 4B is an illustrative flow chart depicting an example operation for determining a transmission rate of frames received from another wireless device in accordance with some embodiments.
Figure 8:
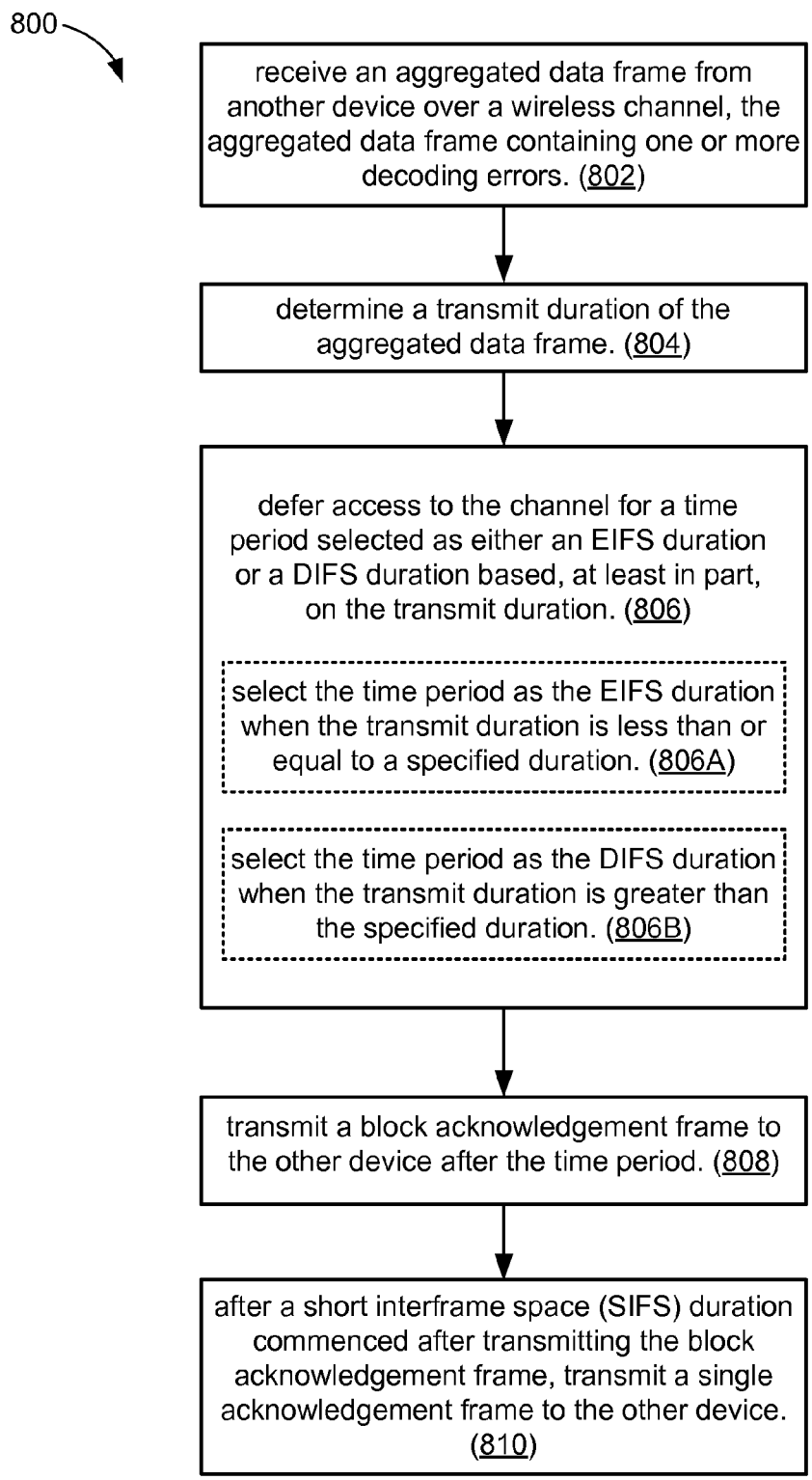
FIG. 8 is an illustrative flow chart depicting an example operation for deferring access to a wireless channel in accordance with some embodiments.

Memory 240 may also include a non-transitory computer-readable medium (e.g., one or more nonvolatile memory elements, such as EPROM, EEPROM, Flash memory, a hard drive, and so on) that may store the following software modules:

- a frame exchange software module 244 to facilitate the creation and/or exchange of frames (e.g., data frames, ACK frames, BA frames, request frames, response frames, beacon frames, management frames, association frames, control frames, action frames, management frames, and so on), for example, as described for operations 401, 402, and 408 of FIG. 4A and/or for operations 601, 602, and 610 of FIG. 6;
- a transmission rate determination software module 246 to determine the transmission rate of one or more received data frames (e.g., by retrieving such information from the transmission rate look-up table 242, or by extrapolating the transmission rate from the MCS information embedded in the received data frames), for example, as described for operation 404 of FIG. 4A, operations 411-412 of FIG. 4B, and/or for operation 604 of FIG. 6;
- a bitmap selection software module 248 to select the size of the block acknowledgement bitmap to be embedded within a BA frame, for example, as described for operation 406 of FIG. 4A and/or for operations 606 and 608 of FIG. 6; and
- a channel access defer software module 249 to selectively defer access to a wireless channel, for example, as described for operations 802, 804, 806, 808, and 810 of FIG. 8.

Each software module includes instructions that, when executed by processor 230, may cause STA 200 to perform the corresponding functions.

Processor 230, which is coupled to transceiver 220 and memory 240, may be any suitable processor capable of executing scripts or instructions of one or more software programs stored in STA 200 (e.g., within memory 240). For example, processor 230 may execute the frame exchange software module 244 to facilitate the creation and/or exchange of various types of frames with one or more other wireless devices. Processor 230 may also execute the transmission rate determination software module 246 to determine the transmission rate of one or more frames received from another wireless device. Processor 230 may also execute the bitmap selection software module 248 to select the size of the block acknowledgement bitmap to be embedded within a block acknowledgement frame (e.g., either a CBA frame or an EBA frame) sent to one or more other wireless devices.

Figure 3A:
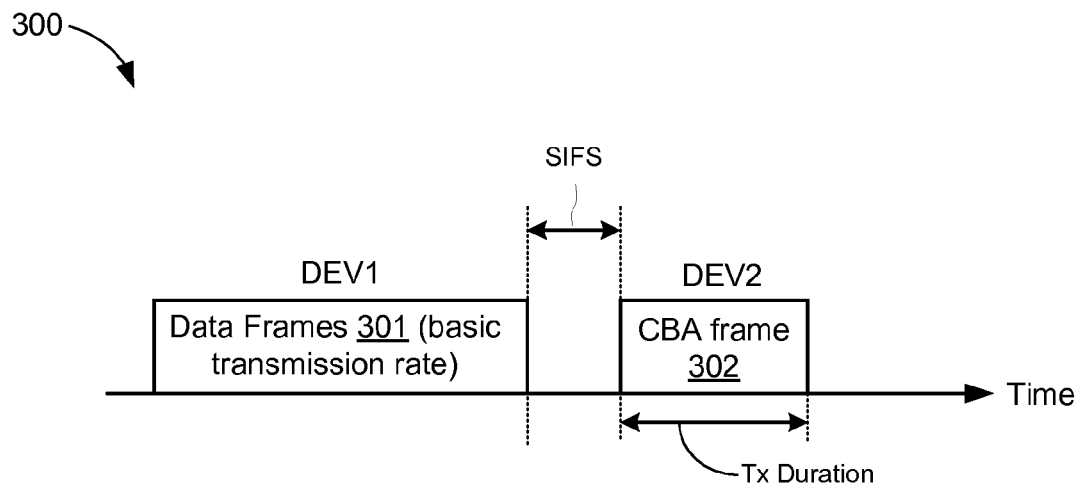
FIG. 3A shows a sequence diagram depicting an example exchange of frames between wireless devices using a basic (e.g., a relatively low) transmission rate.

FIG. 3A depicts a first frame exchange 300 between a first wireless device (DEV1) and a second wireless device (DEV2). For purposes of discussion herein, DEV1 may be any suitable wireless device (e.g., AP 110 or one of the STAs of FIG. 1), and DEV2 may be any suitable wireless device (e.g., another of the STAs of FIG. 1). DEV1 transmits a plurality of data frames 301 to DEV2 using one of a number of basic PHY transmission rates. For example, the 802.11 family of standards currently mandates that compliant wireless devices support basic transmission rates of 6 Mbps, 12 Mbps, and 24 Mbps. For the exemplary frame exchange 300 shown in FIG. 3A, DEV1 transmits the data frames 301 at the basic transmission rate of 24 Mbps. When DEV2 receives the data frames 301, DEV2 sends a CBA frame 302 to DEV1 at one of the basic transmission rates (e.g., at 24 Mbps) to acknowledge receipt of data frames 301.

As depicted below in Table 1, the CBA frame 302 typically includes a total of 32 bytes or octets of information: 2 bytes for frame control (fc), 2 bytes for virtual carrier sense duration (dur), 6 bytes for the receiver address (ra), 6 bytes for the transmitter address (ta), 2 bytes for block acknowledgement control (bac), 2 bytes for the block acknowledgement starting sequence control (bassc), 8 bytes for the block acknowledgement bitmap (bab), and 4 bytes for the frame check sequence (fcs). As mentioned above, the 8-byte block acknowledgement bitmap includes 8*8=64 bits that may be used to acknowledge receipt of up to 64 of the data frames 301.

TABLE 1

| Field | Bytes |
|---|---|
| fc | 2 |
| dur | 2 |

TABLE 1-continued

| Field | Bytes |
|---|---|
| ra | 6 |
| ta | 6 |
| bac | 2 |
| bassc | 2 |
| bab | 8 |
| fcs | 4 |
| total | 32 |

Per current Wi-Fi protocols, DEV2 may transmit the CBA frame 302 to DEV1 using the same (or lower) transmission rate as that of the data frames 301. Thus, for the exemplary exchange 300 of FIG. 3A, DEV2 transmits the CBA frame 302 to DEV1 at the basic transmission rate of 24 Mbps. The CBA frame 302 contains 32 bytes of information, and has a transmit duration of approximately 32 μs at the basic (e.g., relatively low) transmission rate of 24 Mbps. It is noted that at the basic transmission rate of 24 Mbps, the 8-byte block acknowledgement bitmap of the CBA frame 302 may fit in three data symbols, each having a duration of 4 μs, for a total PHY Protocol Data Unit (PPDU) transmit duration of 32 μs, including a 20 μs PHY header. Thus, for some embodiments, the 32 μs duration may be referred to herein as the EBA reference duration, as described in more detail below. For other PHY rates (e.g., corresponding to various types and/or configurations of PHY devices), the EBA reference duration may be of durations other than 32 μs.

In accordance with the present embodiments, DEV2 may be configured to acknowledge receipt of data frames from DEV1 by sending an EBA frame having a relatively large block acknowledgement bitmap (e.g., rather than a CBA frame having a relatively small block acknowledgement bitmap of, for example, 8 bytes) when the transmission rate of the received data frames is greater than a threshold value. For some embodiments, the threshold value may be determined as the minimum transmission rate for which the transmit duration of the EBA frame is the same as the transmit duration of the CBA frame when transmitted at the basic transmission rate (e.g., when the transmit duration of the EBA frame is equal to (or less than) the EBA reference duration). For such embodiments, the minimum transmission rate (and thus the threshold value) is based, at least in part, on the total size of the EBA frame, and thus also is based, at least in part, on the size of the block acknowledgement bitmap in the EBA frame. Thus, for at least some embodiments, the size of the block acknowledgement bitmap embedded within the EBA frame may be selected based at least in part on the transmission rate of the data frames received from DEV1. For at least another embodiment, DEV2 may select between different predetermined BA frames (e.g., either the EBA frame or the CBA frame) based at least in part on the transmission rate of the data frames received from DEV1.

Figure 3B:
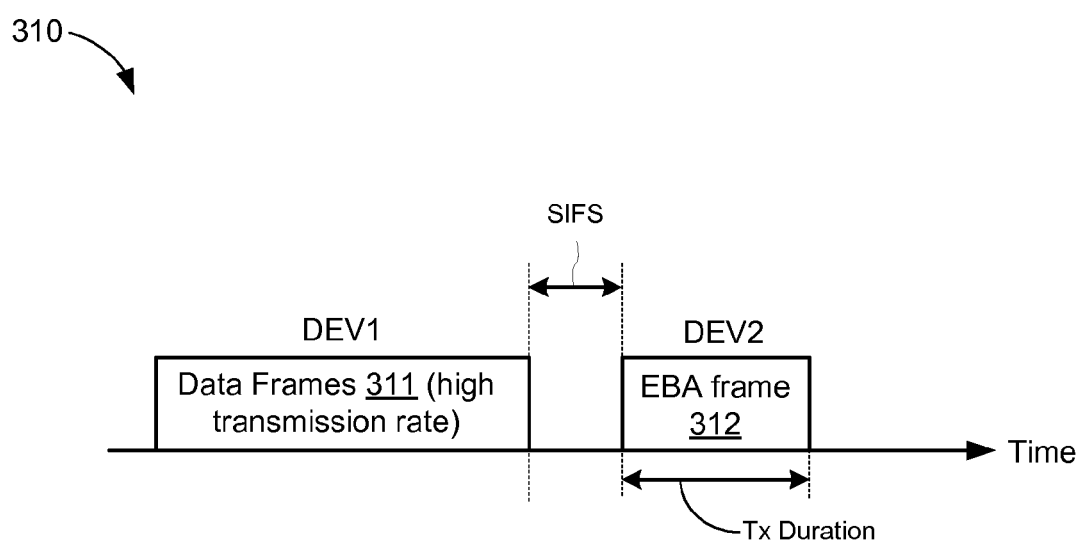
FIG. 3B shows a sequence diagram depicting an example exchange of frames between wireless devices using a fast (e.g., a relatively high) transmission rate in accordance with some embodiments.

For example, if the EBA frame includes a 32-byte block acknowledgement bitmap, and thus includes a total of 56 bytes of information, then the EBA frame may be transmitted to DEV1 in approximately 32 μs when the transmission rate of the EBA frame is in the range of approximately 48 Mbps to approximately 54 Mbps. Thus, referring now to FIG. 3B, when data frames 311 received from DEV1 were transmitted at a relatively high transmission rate of 48 Mbps (or greater), then DEV2 may send an EBA frame 312 including a 32-byte block acknowledgement bitmap to DEV1 at the relatively high transmission rate of 48 Mbps (or greater). It is noted that the transmit duration for EBA frame 312 of FIG. 3B is similar to the transmit duration for CBA frame 302 of FIG. 3A, and that at the relatively high transmission rate of 48 Mbps, the 32-byte block acknowledgement bitmap of the EBA frame 312 may fit in three data symbols, each having a duration of 4 μs, for a total PHY Protocol Data Unit (PPDU) transmit duration of 32 μs, including a 20 μs PHY header.

The 32-byte block acknowledgement bitmap may be used to acknowledge up to 32*8=256 data frames 311 received from DEV1. Thus, when DEV2 is able to transmit EBA frame 312 including a 32-byte block acknowledgement bitmap instead of CBA frame 302 including an 8-byte block acknowledgement bitmap, DEV2 may use EBA frame 312 of FIG. 3B to acknowledge 4 times (e.g., 64*4=256) the number of data frames as the CBA frame 302 of FIG. 3A.

The wireless device DEV2 may determine the transmission rate of the received data frames 311 using any suitable techniques. For at least some embodiments, DEV2 may determine the transmission rate of the received data frames 311 by extracting the MCS information embedded in the PHY header of the PPDU or A-MPDU containing the one or more data frames. The transmission rate of the data frames may be extrapolated (or otherwise derived) from the extracted MCS information. Alternatively, DEV2 may include the transmission rate look-up table 242 of FIG. 2, and use the extracted MCS information as a search key to retrieve the corresponding transmission rate from the transmission rate look-up table 242.

For some embodiments, the transmission rate of the EBA frame 312 may be greater than the transmission rate of the received data frames 311 (e.g., outside of the basic transmission rate/MCS set). For other embodiments, the transmission rate of the EBA frame 312 may be lower than the transmission rate of the received data frames 311, in which case DEV2 may use the projected transmission rate of the EBA frame 312 when deciding whether to transmit the EBA frame 312 or the CBA frame 302. It is noted, however, that the transmission rate of the EBA frame 312 may be capped at some upper limit (e.g., 65 Mbps) to prevent the transmit duration of the EBA frame from becoming less than 24 μs (which is the shortest packet duration with one data symbol).

By determining whether to acknowledge received data frames using either a CBA frame or an EBA frame based, at least in part, on the transmit duration of the ACK frame, third party STAs (that may encode only the PHY portion of the data frame) may be able to determine the proper time to defer for a possible hidden response frame transmission due to the equal transmit durations of the EBA frame and the CBA frame.

FIG. 4A is an illustrative flow chart depicting an example operation 400 for selecting a size of a block acknowledgement bitmap in accordance with some embodiments. For at least one embodiment, the operation 400 may be used to determine whether to acknowledge a multitude of frames sent from a first wireless device (DEV1) to a second wireless device (DEV2) using a CBA frame or an EBA frame. DEV2 receives a number of data frames from DEV 1 (402), and determines a transmission rate of the data frames (404). Then, DEV2 selects a size of the block acknowledgement bitmap based at least in part on the determined transmission rate (406).

For example, DEV2 may select a relatively small size of the block acknowledgement bitmap (e.g., consistent with a CBA frame) when the transmission rate is less than or equal to a threshold value (406A), and may select a relatively large size of the block acknowledgement bitmap (e.g., associated with an EBA frame) when the transmission rate is greater than the threshold value (406B). For some embodiments, the relatively small size may be denoted as an integer S, and the relatively large size may be denoted as an integer L that is at least twice the value of S.

DEV2 embeds the block acknowledgement bitmap of the selected size into a BA frame (408). Then, DEV2 transmits the BA frame, including the block acknowledgement bitmap of the selected size, to DEV1 (408). The block acknowledgement bitmap allows DEV2 to acknowledge a multitude of frames (or aggregated frames) using a single BA frame, wherein each bit of the block acknowledgement bitmap is to acknowledge receipt of a corresponding one of a plurality of data frames transmitted by DEV1.

FIG. 4B is an illustrative flow chart depicting an example operation 410 for determining a transmission rate of frames received from another wireless device in accordance with some embodiments. First, DEV2 may extract a modulation and coding scheme (MCS) from a header of one of the received data frames (411). Then, DEV2 may determine the transmission rate of the received data frames based at least in part on the extracted MCS (412). For at least one embodiment, DEV2 may determine the transmission rate transmission rate by generating a search key from the MCS (412A), providing the search key to a look-up table that stores a number of mappings between MCS values and transmission rates (412B), and retrieving the determined transmission rate from the look-up table based at least in part on the search key (412C).

Referring again to FIG. 3A, for other embodiments, DEV2 may be configured to acknowledge receipt of data frames from DEV1 by sending an EBA frame containing a relatively large block acknowledgement bitmap (e.g., rather than a CBA frame containing a relatively small block acknowledgement bitmap) if the relatively large block acknowledgement bitmap can fit within a selected number N of data symbols at a transmission rate that is less than or equal to the transmission rate at which the data frames were sent from DEV1 to DEV2, wherein N is an integer greater than or equal to 1. More specifically, for at least one of such other embodiments, DEV2 may be configured to select the largest block acknowledgement bitmap that can fit within the selected number N of data symbols of the EBA frame to be transmitted to DEV1. It is noted that the transmission rate of the EBA frame may be greater than the transmission rate of the data frames when the link between DEV1 and DEV2 exhibits asymmetric properties.

For some embodiments, DEV2 may determine the transmission rate at which the data frames were transmitted from DEV1 to DEV2 (e.g., by decoding the MCS information provided within one or more of the received data frames), and then use the determined transmission rate to select the highest possible response MCS for transmitting a response frame to DEV1. At the highest possible response MCS, DEV2 may determine the maximum response MPDU size that can be transmitted in a selected number N of data symbols. Based at least in part on the maximum response MPDU size, DEV2 may determine a largest block acknowledgement bitmap that can be transmitted in the selected number N of data symbols. Based at least in part on the determined largest block acknowledgement bitmap, DEV2 may determine a response MCS for which the response BA frame with the determined largest block acknowledgement bitmap contains exactly the selected number N of data symbols. More generally, a device may select a largest possible block acknowledgement bitmap that can be transmitted in up to a selected number N of symbols at a selected MCS, and then transmit a BA frame with the selected block acknowledgement bitmap at an MCS such that the BA frame contains exactly the selected number N of data symbols.

Figure 5:
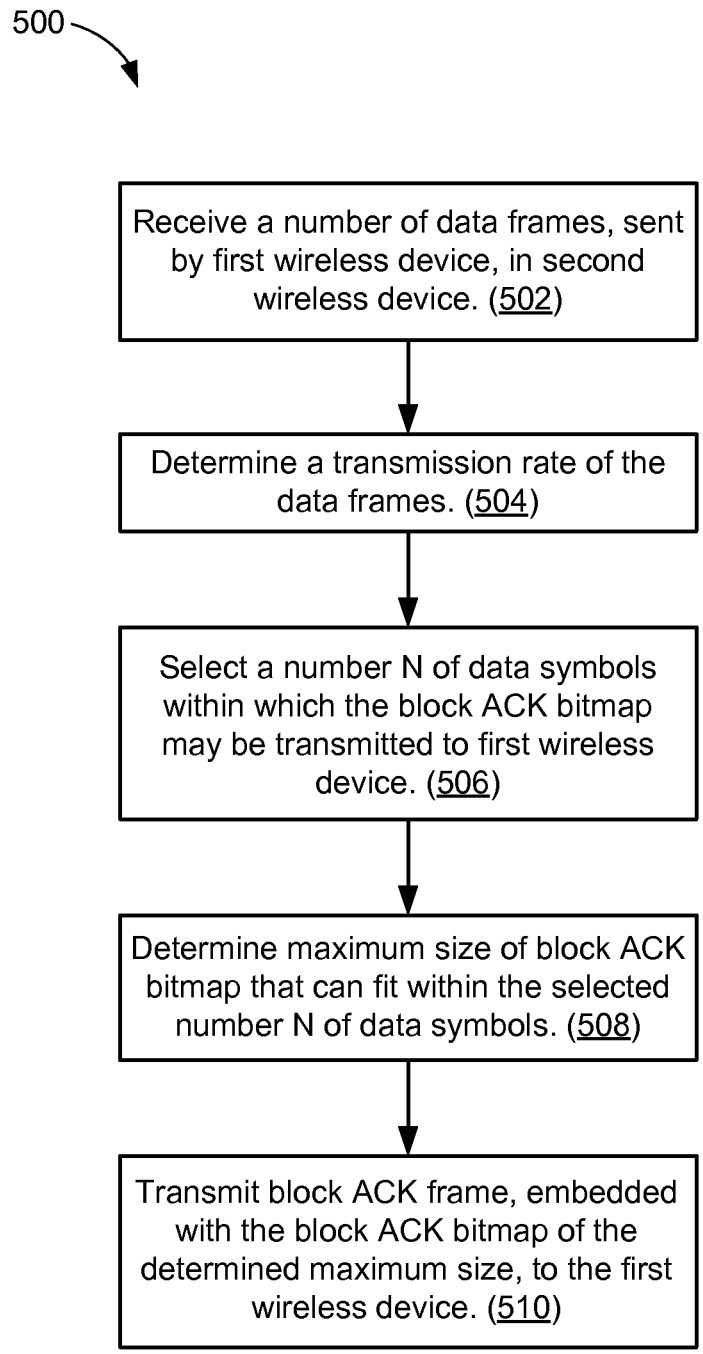
FIG. 5 is an illustrative flow chart depicting an example operation for selecting the maximum size of a block acknowledgement bitmap that may fit within a selected number of data symbols of a BA frame, in accordance with some embodiments.

An exemplary operation for selecting the maximum size of a block acknowledgement bitmap that may fit within a selected number of data symbols of a BA frame is described below with respect to the illustrative flow chart 500 of FIG. 5. A second device (DEV2) receives a number of data frames from a first device (DEV1) (502), and determines a transmission rate of the data frames (504). Then, DEV2 selects a number N of data symbols within which the block acknowledgement bitmap may be transmitted to the first wireless device (506). Next, DEV2 determines the maximum size of the block acknowledgement bitmap that can fit within the selected number N of data symbols (508).

For some embodiments, DEV2 may use the determined transmission rate to select the highest possible response MCS for transmitting a response frame to DEV1. At the highest possible response MCS, DEV2 may determine the maximum response MPDU size that can be transmitted to DEV1 in the selected number N of data symbols. Based at least in part on the maximum response MPDU size, DEV2 may determine a largest block acknowledgement bitmap size that can be transmitted to DEV1 in the selected number N of data symbols. Based at least in part on the determined largest block acknowledgement bitmap, DEV2 may determine a response MCS for which the BA frame with the determined largest block acknowledgement bitmap contains exactly the selected number N of data symbols.

Then, DEV2 transmits a BA frame that includes a block acknowledgment bitmap of the determined maximum size (510).

By transmitting a BA frame containing the largest possible block acknowledgement bitmap to the first wireless device, the second wireless device may acknowledge the largest possible number of received data frames using a single block acknowledgement frame, which in turn may reduce the number of ACK frames needed to acknowledge receipt of the data frames.

The above-described operation may be defined as a response rule as follows:
1. A STA that transmits a BA frame as a response on a link that supports EBA is to fit the longest possible EBA frame that is supported on the link in a PPDU that has a transmit duration that is equal to the EBA reference duration and which uses a PHY mode that has a data rate that is less than or equal to the data rate of the PPDU containing the MPDU that solicits the response and which has the same channel bandwidth as that PPDU. The EBA reference duration may be determined by transmitting the EBA frame in an A-MPDU and by adding EOF padding and/or by including multiple instances of the EBA frame in the A-MPDU. In this manner, the response rule may cause every response EBA frame to have the same transmit duration as a dynamic EIFS duration; and
2. A STA that receives a response EBA frame is to transmit an ACK or another MPDU in response to the received EBA frame. In this manner, the EIFS duration started by the transmission of the EBA frame is truncated at devices that receive the ACK frame or the other MPDU.

For some embodiments, a new rule (hereinafter denoted as the EIFS rule) may be used to prevent receiving devices from using extended interframe space (EIFS) durations instead of DCF interframe space (DIFS) durations when there are problems decoding MAC portions of the received PPDUs. For example, in accordance with current IEEE 802.11 protocols, a receiving device that cannot decode one or more portions of a received frame (e.g., because of errors in the frame) defers its backoff by the EIFS duration, instead of by the DIFS duration. This allows a possible ACK frame to be transmitted without interference from the receiving device. Typically, the EIFS duration is equal to the transmit duration of the ACK frame (at the lowest basic transmission rate) plus the SIFS duration plus the DIFS duration.

Thus, for at least some embodiments, the new EIFS rule may state that if a PPDU with the selected number N of data symbols is received by a receiving device, then the receiving device might not defer transmission of the BA frame according to the EIFS duration even if one or more portions of the BA frame cannot be decoded by the receiving device. In this manner, idle transmission periods may be reduced by using the DIFS duration rather than the EIFS duration. More generally, if a PPDU is received that has a duration that is equal to the duration of a CBA frame that is transmitted at a basic MCS/rate or a PHY mandatory MCS/rate (e.g., if the transmit duration of the PPDU equals (or is less than) the EBA reference duration), then an EIFS duration may be reduced to a DIFS duration. Therefore, when frames to which no response is requested (e.g., block ACK frames) use only those durations, these frames to which no response is requested will not cause an EIFS to be started at surrounding devices, which is desirable because there is no response expected after the frame (e.g., EIFS protection is not required). For example, the duration of a CBA frame at 24 Mbps OFDM is 32 µs, which as noted above may be referred to as the EBA reference duration.

So, if a PPDU of transmit duration 32 µs is received, an EIFS duration (should one be needed) may be reduced to a DIFS duration, and any BA frame that is larger than a CBA frame is transmitted at an MCS/rate such that the transmit duration of the BA frame is exactly 32 µs. If a short frame is to be transmitted and a response frame is expected from the receiving device, then the transmitting device may pad the short frame so that the resulting padded PPDU does not contain the selected number N of data symbols (e.g., so that the padded PPDU contains more than N data symbols). The short frames may be padded using any suitable technique including, for example, MPDU delimiters that indicate a zero length and/or end of frame (EOF) delimiters.

For other embodiments, only PPDUs that contain MPDUs of the same size of the EBA frames may be prevented (by the new EIFS rule) from using the EIFS duration rather than the DIFS duration. Some exemplary EBA frame sizes (e.g., MPDU sizes) are shown below in Table 2:

TABLE 2

EBA frame sizes

| Frame Type | Bytes |
|---|---|
| BA32 | 56 |
| BA64 | 88 |
| BA128 | 152 |
| BA256 | 280 |

In addition, FIG. 6 shows a table 600 depicting exemplary sizes of EBA frames and their corresponding transmit durations for various transmission rates.

For some embodiments, an EBA frame may be formed using the format of a CBA frame and assigning a reserved value of the BA frame's variant encoding to indicate that the frame includes a larger bitmap than what is normally associated with the CBA frame. For example, Table 3 below depicts an exemplary format for EBA frames that include a 32-byte block acknowledgement bitmap:

TABLE 3

| Field | Bytes |
|---|---|
| fc | 2 |
| dur | 2 |
| ra | 6 |
| ta | 6 |
| bac | 2 |
| bassc | 2 |
| bab | 32 |
| fcs | 4 |
| total | 56 |

An exemplary encoding for block ACK frame variants is shown below in Table 4:

TABLE 4

| Multi-TID subfield value | Compressed Bitmap subfield value | GCR subfield value | Block ACK frame variant |
|---|---|---|---|
| 0 | 0 | 0 | Basic Block ACK |
| 0 | 1 | 0 | Compressed Block ACK (CBA) |
| 1 | 0 | 0 | Extended CBA |
| 1 | 1 | 0 | Multi-TID Block ACK |
| 0 | 0 | 1 | Reserved |
| 0 | 1 | 1 | GCR Block ACK |
| 1 | 0 | 1 | Reserved |
| 1 | 1 | 1 | Extended Block ACK (EBA) |

As shown in the exemplary Table 4, the encoded value "111" may be used to denote the EBA frame format, and the encoded value "100" may be used to denote the Extended CBA frame format. The Extended CBA frame format is the same as the CBA frame format, except that flow control information is added. The value "100" should not be confused with the EBA frame format described herein.

The length of the block acknowledgement bitmap may be encoded in one or more reserved bits of the Block ACK Control (bac) field, as shown below in Table 5:

TABLE 5

| bac field: | BA policy | multi-tid | compressed bitmap | GCR | reserved | bitmap size | tid_info |
|---|---|---|---|---|---|---|---|
| bits: | 1 | 1 | 1 | 1 | 6 | 2 | 4 |

The length of the block acknowledgement bitmap also may be encoded using bits in the bitmap size field of the block acknowledgement control (bac) field. Exemplary values of the bitmap size field and corresponding sizes of the block acknowledgement bitmap are shown below in Table 6:

TABLE 6

| bitmap size field value | Block ACK Bitmap size (octets) | Frame Name |
|---|---|---|
| 0 | 32 | BA32 |
| 1 | 64 | BA64 |
| 2 | 128 | BA128 |
| 3 | 256 | BA256 |

According to the exemplary mapping depicted in Table 5, the block acknowledgement bitmap size S may be expressed as $S=32*2^b$, wherein b denotes the bitmap size field value. For example, block acknowledgement bitmap sizes of 32 bytes, 64 bytes, 128 bytes, and 256 bytes may be denoted by b equal to 0, 1, 2, and 3, respectively.

The corresponding EBA frames and transmit durations are shown in FIG. 6. The PHY rates at which block acknowledgement bitmaps of sizes 32 bytes, 128 bytes, 512 bytes, and 2048 bytes (e.g., as defined by sizes of $S=32*2^b$) may fit into 3 data symbols (e.g., as indicated by the transmit duration of 32 μs) of such EBA frames are approximately equal to 48 Mbps, 63 Mbps, 103 Mbps, and 188 Mbps, respectively, as indicated in FIG. 6.

Because the transmission rates (e.g., the PHY rates) are relatively close to one another, at which the EBA frame's block acknowledgement bitmap may fit within 3 data symbols for various block acknowledgement bitmap sizes, it may be possible to increase the difference in size between the various block acknowledgement bitmaps. For example, instead of defining the block acknowledgment bitmap size as $S=32*2^b$ (as depicted above in Table 5), the block acknowledgement bitmap size may be expressed as $S=32*4^b$. Hence, this may denote block acknowledgement bitmap sizes of 32 bytes, 128 bytes, 512 bytes, and 2048 bytes for values of b equal to 0, 1, 2, and 3, respectively, as shown below in Table 7:

TABLE 7

| bitmap size field value | Block ACK Bitmap size (octets) | Frame Name |
| --- | --- | --- |
| 0 | 32 | BA32 |
| 1 | 128 | BA128 |
| 2 | 512 | BA512 |
| 3 | 2048 | BA2048 |

The PHY rates at which block acknowledgement bitmaps of sizes 32 bytes, 128 bytes, 512 bytes, and 2048 bytes (e.g., as defined by sizes of $S=32*4^b$) may fit into 3 data symbols of EBA frames are approximately equal to 48 Mbps, 103 Mbps, 359 Mbps, and 1383 Mbps, respectively. In contrast, the PHY rates at which block acknowledgement bitmaps of sizes 32 bytes, 64 bytes, 128 bytes, and 256 bytes (e.g., as defined by sizes of $32*2^b$) may fit into 3 data symbols of such EBA frames are approximately equal to 48 Mbps, 63 Mbps, 103 Mbps, and 188 Mbps, respectively.

For at least some embodiments, the encoded value "101" associated with the BA frame variant encoding may instead denote the EBA format with a flow control (fc) extension, as depicted below in Table 8:

TABLE 8

| Multi-TID subfield value | Compressed Bitmap subfield value | GCR subfield value | Block ACK frame variant |
| --- | --- | --- | --- |
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Extended Block Ack with FC |
| 1 | 1 | 1 | Extended Block Ack |

Note that the block acknowledgement bitmap size may be encoded in a block access control (bac) field for the EBA frame format with flow control (fc) and/or for the EBA frame format without flow control.

In other embodiments, the extended block acknowledgement frames are defined within the Compressed BlockAck frame variant by adding a bitmap size field to the Block ACK Control (bac) field of Compressed BlockAck frames or Extended Compressed BlockAck frames, as shown in Table 9:

TABLE 9

| bac field: | BA policy | multi-tid | compressed bitmap | GCR | reserved | bitmap size | tid_info |
| --- | --- | --- | --- | --- | --- | --- | --- |
| bits: | 1 | 1 | 1 | 1 | 6 | 2 | 4 |

Exemplary lengths of the block acknowledgement bitmap as encoded using the newly defined bitmap size field of the block acknowledgement control (bac) field of Compressed BlockAck frames or Extended Compressed BlockAck frames is shown in Table 10.

TABLE 10

| bitmap size field value | Block ACK Bitmap size (octets) | Frame Name |
| --- | --- | --- |
| 0 | 8 | BA8 |
| 1 | 32 | BA32 |
| 2 | 128 | BA128 |
| 3 | 512 | BA512 |

In some embodiments, value 0 of the bitmap size field is necessarily reserved for an 8-octet block acknowledgement bitmap. This value may map to the existing Compressed BlockAck frames or Extended Compressed BlockAck frames.

As mentioned above, the EIFS rule disclosed herein may be used to prevent receiving devices from using extended interframe space (EIFS) durations instead of DCF interframe space (DIFS) durations when there are problems decoding MAC portions of the received data frames. For at least some embodiments, a wireless device may determine a transmit duration of a data frame received over a channel. If the transmit duration of the received data frame is equal to a specified duration (e.g., if the transmit duration of the received data frame is equal to the EBA frame reference duration), the wireless device may be prevented from using the EIFS duration to defer accessing the channel. For at least one other embodiment, the wireless device may be prevented from using the EIFS duration to defer accessing the channel if the transmit duration of the received data frame is less than some specified duration.

For another embodiment, the wireless device may determine a number of data symbols used to transmit a data frame. If the number of data symbols is equal to a specified number, the wireless device may be prevented from using the EIFS duration to defer accessing the channel. For another embodiment, a wireless device that is to transmit an A-MPDU may determine a number of data symbols required to transmit the A-MPDU at a specified MCS. The wireless device may form an expanded A-MPDU by adding one or more zero-length MPDU delimiters to the A-MPDU if the number of data symbols is equal to a specified number (e.g., such that the number of data symbols required to transmit the expanded A-MPDU at the specified MCS exceeds the specified number).

For another embodiment, a wireless device that is to transmit an A-MPDU may determine a number of data symbols required to transmit the A-MPDU at a specified MCS. The wireless device may then form an expanded A-MPDU by adding one or more zero-length MPDU delimiters to the A-MPDU if the number of data symbols is equal to or less than a specified number (e.g., such that the number of data symbols required to transmit the expanded A-MPDU at the specified MCS exceeds the specified number).

As mentioned above, some embodiments may define an EIFS rule that prevents devices that receive a response EBA frame having a specified transmit duration (e.g., equal to the EBA reference duration of, for example, 32 µs) from deferring medium access by the regular EIFS duration when there are problems decoding MAC portions of the response frame. In some embodiments, the EIFS time after what appears to be an EBA frame may be defined to be equal to a DIFS time. This captures the case in which no response frame is transmitted after the EBA frame.

For other embodiments, a receiving device may truncate an EIFS duration for medium access deferral in response to an EBA frame by transmitting, after a SIFS duration, an ACK frame. For example, FIG. 7A shows a sequence diagram 710 depicting an exemplary frame exchange with a response EBA frame and dual EIFS truncation in accordance with some embodiments. First, DEV1 transmits an A-MPDU to DEV2 at a transmission rate of 65 Mbps. DEV2 receives the A-MPDU, and after a SIFS duration, transmits a response EBA frame at 48 Mbps to DEV1. The EBA frame has a transmit duration of 32 µs, which for purposes of this example equals the EBA reference duration, and therefore the EIFS rule may be applicable. However, rather than starting either the EIFS duration or shortening the EIFS duration to the DIFS duration when there are errors in the EBA frame, DEV2 may wait for only the SIFS duration, and then transmit an ACK frame (e.g., at the lowest basic transmission rate of 6 Mbps).

Concurrently, after the SIFS duration, DEV1 may transmit an ACK frame (e.g., at the lowest basic transmission rate of 6 Mbps). The ACK frames transmitted by DEV1 and DEV2 may include the same content (e.g., the same scrambler seed in the PHY header and the same receiver address). The receiver addresses may be equal to the MAC address of DEV1 or DEV2, depending on the set convention. For at least one embodiment, the duration field of the MAC headers in both ACK frames may be set to the value 0. Instead of an ACK frame, DEV1 and/or DEV2 may transmit a CF-End frame with the same value for the address fields, the duration field and the scrambler seed, in which case a pending Network Allocation Vector (NAV) may be truncated.

Transmission of the ACK frame at the lowest basic rate may cause other devices proximate to DEV1 and DEV2 (e.g., within the wireless range of DEV1 and DEV2) to not start an EIFS duration after receiving the ACK frame (e.g., because the ACK frame includes checked Frame Check Sequence (FCS)). In this manner, transmission of the ACK frames from DEV1 and/or DEV2 after the SIFS duration may essentially truncate the EIFS duration of such other proximate devices, thereby further minimizing idle time of the wireless medium and potential unfair channel access.

If DEV2 acknowledges receipt of the A-MPDU from DEV1 by transmitting an EBA frame to DEV1, it is likely that DEV1 and DEV2 are relatively close to each other. Further, if DEV1 and DEV2 are relatively close to one another (e.g., less than a threshold distance from each other), then other devices proximate to DEV1 and DEV2 may be able to receive and respond to frames transmitted from DEV1. As a result, for other embodiments, only DEV1 may transmit the ACK frame after the SIFS duration commenced in response to the EBA frame. For example, FIG. 7B shows a sequence diagram 720 depicting a frame exchange with a response EBA frame and single EIFS truncation in accordance with some embodiments. One advantage of the sequence diagram 720 of FIG. 7B (as compared with the sequence diagram 710 of FIG. 7A) is that no signaling is needed for the A-MPDU frame transmitted at 65 Mbps because DEV1 may gain access to the medium after only a SIFS duration after the transmitting the response EBA frame. Instead of an ACK frame, DEV1 may transmit a CF-End frame to also truncate a NAV.

FIG. 7C shows a sequence diagram depicting a frame exchange 730 with a response EBA frame, single EIFS truncation, and an EIFS duration after the EBA frame in accordance with some embodiments. The frame exchange depicted in FIG. 7C is similar to the frame exchange of FIG. 7B while providing symmetric protection in manner similar to the frame exchange depicted in FIG. 7A. More specifically, for the frame exchange of FIG. 7C, when DEV1 receives a response EBA frame (a PPDU having a transmit duration of 32 µs for OFDM, HT, and/or VHT PHY devices) or a frame that appears to be the response frame, DEV1 starts an EIFS duration that may last for the same amount of time as the transmit duration ($T_{ACK}$) of the ACK frame transmitted by DEV1 (including the preceding SIFS) plus a DIFS period. For such embodiments, the duration field of the EBA frame indicates a NAV duration of at least a period of time equal to the SIFS duration+$T_{ACK}$.

For example, when DEV1 transmits a terminating ACK frame at the highest basic transmission rate of 24 Mbps, the EIFS rule described above may be replaced by a dynamic EIFS rule stating that when a device receives a frame having a transmit duration of 32 µs at a data rate that is greater than or equal to 24 Mbps, then the EIFS duration becomes a dynamic EIFS duration equal to SIFS+$T_{ACK@24\ Mbps}$+DIFS. For this example, the dynamic EIFS duration=16+28+34=78 µs. The value of the duration field may be expressed as SIFS+$T_{ACK@24\ Mbps}$=16+28=44 µs.

For a terminating ACK frame transmitted at the lowest basic transmission rate of 6 Mbps, the dynamic EIFS rule may state that when a device receives a frame having a transmit duration of 32 µs at a data rate that is greater than or equal to 24 Mbps, then the dynamic EIFS duration is equal to SIFS+$T_{ACK@6\ Mbps}$+DIFS. For this example, the dynamic EIFS duration=16+44+34=94 µs. The value of the duration field may be expressed as SIFS+$T_{ACK@6\ Mbps}$=16+44=60 µs. An exemplary frame exchange for this example is shown in FIG. 7D.

FIG. 7D shows a sequence diagram 740 depicting a frame exchange with an EBA response frame, single EIFS truncation, and an EIFS duration after the EBA frame in accordance with other embodiments. The appropriate value of the duration field of the EBA frame may be provided or assigned by including the ACK frame in the duration field setting of the A-MPDU that contains the Block ACK Request. For some embodiments, the ACK frame depicted in FIG. 7C and/or FIG. 7D may also be a CF-End, in which case the EIFS duration is slightly longer (EIFS=78 µs for a 24 Mbps CF-End frame and EIFS=102 µs for a 6 Mbps CF-End frame).

For frames that do not include a duration value (e.g., Protocol Version 1 (PV1) frames), an EIFS duration is also to be started when the FCS is received correctly unless the frame's PHY header contains an ACK indication, in which case the EIFS duration (or other access deferral period) may be based at least in part on the ACK indication in the PHY header. One example of PV1 frames without an ACK indication in the PHY headers is a PV1 frame transmitted using an OFDM, HT, or VHT modulation in the 5 GHz band.

Figure 7E:
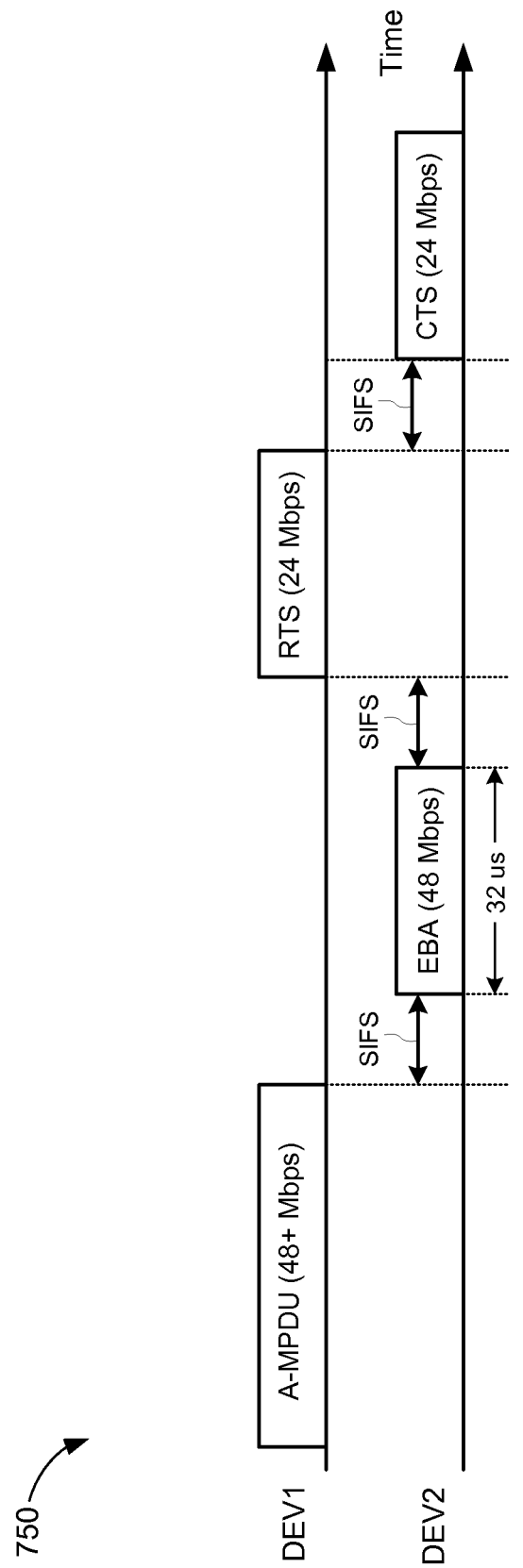
FIG. 7E shows a sequence diagram depicting an example frame exchange with a response EBA frame, a first EIFS truncation through an RTS transmission, and a second EIFS truncation through a CTS transmission.

For alternate embodiments, in order to truncate any EIFS duration that is started after the response EBA frame, the recipient of the response EBA frame may initiate an RTS/CTS frame exchange, which in turn causes the EIFS duration to be symmetrically truncated without changing the dynamic EIFS rules disclosed herein (albeit at the cost of an extra RTS frame). For example, FIG. 7E shows a sequence diagram 750 depicting a frame exchange with a response EBA frame, single EIFS truncation, and an EIFS duration after the EBA frame in accordance with still other embodiments. As depicted in FIG. 7E, after transmission of the response EBA frame, DEV1 may wait a SIFS duration and then transmit an RTS frame at 24 Mbps (having a transmit duration of 44 µs) to DEV2. DEV2 receives the RTS frame and, after a SIFS duration, transmits a CTS frame at 24 Mbps to DEV1. Because a dynamic EIFS rule for the RTS frame is already defined, EIFS truncation may be performed.

The EIFS rules described herein may be defined as follows: The data rate of the highest mandatory non-HT rate of a PHY is referred to as the EBA reference rate. The duration required to transmit a CBA frame at the EBA reference rate is referred to as the EBA reference duration. For example, the highest mandatory non-HT rate for a HT PHY is 24 Mbps, so the EBA reference rate for HT is 24 Mbps. At 24 Mbps, the duration of a CBA frame (which contains 32 octets) is 32 µs, so the EBA reference duration for VHT is 32 µs.

Further, when the PPDU that causes a device to commence an EIFS duration has a transmit duration equal to the EBA reference duration and has a data rate that is greater than the EBA reference rate, the EIFS duration is equal to SIFS+$T_{ACK, est}$+DIFS, where $T_{ACK, est}$ is an estimated transmit duration of the ACK frame based at least in part on the EBA reference rate. For example, for an HT PHY, the EIFS duration is equal to 16+28+34=78 µs. This reflects that a PPDU of duration equal to the EBA reference duration is very likely an EBA frame, which may cause a response ACK to be transmitted.

FIG. 8 shows an illustrative flow chart depicting an example operation 800 for deferring access to a wireless channel in accordance with some embodiments. First, the wireless device receives an aggregated data frame from another device over a wireless channel, the aggregated data frame containing one or more decoding errors (802). Then, the wireless device determines a transmit duration of the aggregated data frame (804). The wireless device then defers access to the channel for a time period selected as either an EIFS duration or a DIFS duration based, at least in part, on the transmit duration (806).

More specifically, for at least some embodiments, the wireless device may select the time period as the EIFS duration when the transmit duration is less than or equal to a specified duration (806A), and may select the time period as the DIFS duration when the transmit duration is greater than the specified duration (806B).

Next, the wireless device may transmit a block acknowledgement frame to the other device after the time period (808). Thereafter, for at least some embodiments, the wireless device may, after a short interframe space (SIFS) duration commenced after transmitting the block acknowledgement frame, transmit a single acknowledgement frame to the other device (810).

In the foregoing specification, embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method, performed by a wireless device, for confirming receipt of aggregated data containing one or more decoding errors, the method comprising:
   determining a transmit duration of an aggregated data frame received from another device over a wireless channel;
   comparing the transmit duration with a transmit duration of an extended block acknowledgement (EBA) frame; and
   deferring access to the wireless channel for a time period selected as either an extended interframe space (EIFS) duration or a distributed coordination function (DCF) interframe space (DIFS) duration based, at least in part, on the comparison, wherein the wireless device is configured to defer access to the wireless channel for the EIFS duration in response to a determination that the transmit duration is less than or equal to the transmit duration of the EBA frame, and wherein the wireless device is configured to defer access to the wireless channel for the DIFS duration in response to a determination that the transmit duration is greater than the transmit duration of the EBA frame.

2. The method of claim 1, wherein the transmit duration is determined using a number of data symbols used to transmit the aggregated data frame to the wireless device.

3. The method of claim 1, further comprising:
   transmitting a block acknowledgement frame to the other device after the time period; and
   after a short interframe space (SIFS) duration commenced after transmitting the block acknowledgement frame, transmitting a single acknowledgement frame to the other device.

4. The method of claim 3, wherein the single acknowledgement frame is transmitted at a basic transmission rate, and instructs nearby wireless devices to refrain from deferring access to the wireless channel by the EIFS duration.

5. A wireless device for confirming receipt of aggregated data containing one or more decoding errors, the wireless device comprising:
   a processor; and
   a memory storing instructions that, when executed by the processor, cause the wireless device to:
      determine a transmit duration of an aggregated data frame received from another device over a wireless channel;
      compare the transmit duration with a transmit duration of an extended block acknowledgement (EBA) frame; and
      defer access to the wireless channel for either an extended interframe space (EIFS) duration or a distributed coordination function (DCF) interframe space (DIFS) duration based, at least in part, on the comparison;
   wherein the processor is configured to cause the wireless device to defer access to the wireless channel for the EIFS duration in response to a determination that the transmit duration is less than or equal to the transmit duration of the EBA frame; and
   wherein the processor is configured to cause the wireless device to defer access to the wireless channel for the DIFS duration in response to a determination that the transmit duration is greater than the transmit duration of the EBA frame.

6. The wireless device of claim 5, wherein the transmit duration is determined using a number of data symbols used to transmit the aggregated data frame to the wireless device.

7. The wireless device of claim 5, wherein execution of the instructions causes the wireless device to further:
   transmit a block acknowledgement frame to the other device after the time period; and
   after a short interframe space (SIFS) duration commenced after transmitting the block acknowledgement frame, transmit a single acknowledgement frame to the other device.

8. The wireless device of claim 7, wherein the single acknowledgement frame is transmitted at a basic transmission rate, and instructs nearby wireless devices to refrain from deferring access to the wireless channel by the EIFS duration.

9. A non-transitory computer-readable medium containing program instructions that, when executed by a processor of a wireless device, causes the wireless device to perform operations comprising:
   determining a transmit duration of an aggregated data frame received from another device over a wireless channel;
   comparing the transmit duration with a transmit duration of an extended block acknowledgement (EBA) frame; and
   deferring access to the wireless channel for a time period selected as either an extended interframe space (EIFS) duration or a distributed coordination function (DCF) interframe space (DIFS) duration based, at least in part, on the comparison;
   wherein the non-transitory computer-readable medium includes instructions for deferring access to the wireless channel for the EIFS duration in response to a determination that the transmit duration is less than or equal to the transmit duration of the EBA frame; and
   wherein the non-transitory computer-readable medium includes instructions for deferring access to the wireless channel for the DIFS duration in response to a determination that the transmit duration is greater than the transmit duration of the EBA frame.

10. The non-transitory computer-readable medium of claim 9, wherein the transmit duration is determined using a number of data symbols used to transmit the aggregated data frame to the wireless device.

11. The non-transitory computer-readable medium of claim 9, wherein execution of the instructions causes the wireless device to further:
   transmit a block acknowledgement frame to the other device after the time period; and
   after a short interframe space (SIFS) duration commenced after transmitting the block acknowledgement frame, transmit a single acknowledgement frame to the other device.

12. The non-transitory computer-readable medium of claim 11, wherein the single acknowledgement frame is transmitted at a basic transmission rate, and instructs nearby wireless devices to refrain from deferring access to the wireless channel by the EIFS duration.

13. A wireless device to confirm receipt of aggregated data containing one or more decoding errors, the wireless device comprising:
   means for determining a transmit duration of an aggregated data frame received from another device over a wireless channel;
   means for comparing the transmit duration to a transmit duration of an extended block acknowledgement (EBA) frame; and
   means for deferring access to the wireless channel for a time period selected as either an extended interframe space (EIFS) duration or a distributed coordination function (DCF) interframe space (DIFS) duration based, at least in part, on the comparison, wherein the means for deferring access comprises:
      means for deferring access to the wireless channel for the EIFS duration in response to a determination that the transmit duration is less than or equal to the transmit duration of the EBA frame; and
      means for deferring access to the wireless channel for the DIFS duration in response to a determination that the transmit duration is greater than the transmit duration of the EBA frame.

14. The wireless device of claim 13, wherein the transmit duration is determined using a number of data symbols used to transmit the aggregated data frame to the wireless device.

15. The wireless device of claim 13, further comprising:
   means for transmitting a block acknowledgement frame to the other device after the time period; and
   means for, after a short interframe space (SIFS) duration commenced after transmitting the block acknowledgement frame, transmitting a single acknowledgement frame to the other device.

16. The wireless device of claim 15, wherein the single acknowledgement frame is transmitted at a basic transmission rate, and instructs nearby wireless devices to refrain from deferring access to the wireless channel by the EIFS duration.

* * * * *